United States Patent
Chen et al.

(10) Patent No.: US 9,340,119 B2
(45) Date of Patent: May 17, 2016

(54) ROOF MOUNTED VEHICLE ANTENNA STATE OF CHARGE INDICATOR APPARATUS

(71) Applicants: VOLKSWAGEN AG, Wolfsburg (DE); AUDI AG, Ingolstadt (DE)

(72) Inventors: Henry Chen, Los Altos, CA (US); Kord Luehr, Wolfenbuettel (DE)

(73) Assignees: VOLKSWAGEN AG, Wolfsburg (DE); AUDI AG, Ingolstadt (DE)

(*) Notice: Subject to any disclaimer, the term of this patent is extended or adjusted under 35 U.S.C. 154(b) by 137 days.

(21) Appl. No.: 14/265,484

(22) Filed: Apr. 30, 2014

(65) Prior Publication Data

US 2015/0314697 A1     Nov. 5, 2015

(51) Int. Cl.
*G08B 21/00* (2006.01)
*B60L 11/18* (2006.01)

(52) U.S. Cl.
CPC ......... *B60L 11/1851* (2013.01); *B60L 11/1861* (2013.01)

(58) Field of Classification Search
CPC .................................................. B60L 11/1851
USPC ............... 340/455, 468, 472; 362/23.01, 487, 362/493; 320/137
See application file for complete search history.

(56) References Cited

U.S. PATENT DOCUMENTS 8,487,752 B2    7/2013    Stillfried et al.

FOREIGN PATENT DOCUMENTS

CA     2831022 A1     9/2012

OTHER PUBLICATIONS

Sharkfin Antenna Style 509 with LED lights; Online product order; downloaded from http://www.carccessory.com/product/sharkfin-antenna/509LED; Jan. 10, 2014.
Silver Solar Powered Car Shark Fin Antenna LED Warning Flash Tail Light Lamps; Online product order; downloaded from http:///www.amazon.com/Silver-Solar-Powered-Antenna-Warning/dp/B . . . ; Jan. 13, 2014.
xSale Wind Powered 30LM LED Car LED Light Shark Fin Antenna Aerials; Online product order; downloaded from http://www.amazon.com; Jan. 2014.

*Primary Examiner* — Jeffery Hofsass
(74) *Attorney, Agent, or Firm* — Barnes & Thornburg LLP

(57) ABSTRACT

An indicator apparatus for providing a status indicator to visibly indicate state of charge information of an electric vehicle is disclosed. The indicator apparatus may be an indicator plate including a first end, a second end opposite the first end, and an indicator positioned between the first and second ends. The indicator may provide an indication of a status of a battery of the electric vehicle by illuminating a portion of the indicator plate based on status information of the battery. The indicator apparatus may further comprise a power port coupled to the electric vehicle for receiving power from the electric vehicle to the illuminated portion of the indicator plate. The illuminated portion may be illuminated based on vehicle diagnostic data received from the electric vehicle and may be visible from outside the electric vehicle.

20 Claims, 4 Drawing Sheets

ROOF MOUNTED VEHICLE ANTENNA STATE OF CHARGE INDICATOR APPARATUS

BACKGROUND

The present disclosure relates to an apparatus, components, and methodologies for State Of Charge (SOC) indication. In particular, the present disclosure is directed to an apparatus, components, and methodologies that enable an indication of the SOC of electric vehicles visible from outside the vehicle.

The State Of Charge (SOC) may refer to a percentage of full charge remaining in the batteries of electric or hybrid vehicles. In other words, the SOC may refer to how "full" the battery is as a percentage value with 100% being fully charged and 0% being empty or flat. Users may not always be aware of the SOC of the battery of the vehicle. Consequently, users may be guessing as to the current SOC of the vehicle's battery. To eliminate this guesswork, devices have been implemented in electric vehicles to visually relay SOC information to vehicle users. For example, SOC indicators have been integrated in the dashboard of electric vehicles, adjacent to vehicle charging ports, or antennae. However, these existing SOC indicators are expensive to manufacture, and not sufficiently clear or visible from outside the vehicle.

SUMMARY

According to the present disclosure, an apparatus is provided to indicate the status of charge of an electric vehicle, which is visible from outside the vehicle.

Disclosed embodiments provide a solution to the above-described technical problems by providing a status indicator to visibly indicate state of charge information of an electric vehicle. Because the status indicator can be attached to a vehicle-integrated rooftop antenna, the status indicator does not require manufacturing of additional antenna systems. As such, manufacturing costs are held to a minimum. Further, by being mounted to the exterior of the vehicle, such as, for example, positioned on an existing "sharkfin" antenna, the status indicator's location is at the highest position of the vehicle allowing maximum visibility around the periphery of the vehicle. The indicator apparatus may be an indicator plate including a first end attached to the roof, a second end opposite the first end and attached to the vehicle-integrated rooftop antenna, and an indicator positioned between and attached to the first and second ends. The indicator may provide an indication of a status of a battery of the electric vehicle by illuminating a portion of the indicator plate based on vehicle diagnostic data received from the vehicle.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Typically, SOC indicators come already integrated in the vehicle. For example, and as discussed above, SOC indicators are installed within the dashboard, which, unfortunately, are not viewable to a user who may be positioned outside the vehicle. Many vehicles come standard with an antenna mounted on the roof, which is visible from the outside of the vehicle, making it an ideal location for an SOC indicator. Unfortunately, to design an entire antenna system with built-in electronics to visually indicate SOC information would expend great research and development resources and manufacturing costs with little to no return on investment.

Disclosed embodiments provide a solution to the above-described technical problems by providing a status indicator to visibly indicate state of charge information of an electric vehicle. Because the status indicator can be attached to a vehicle-integrated rooftop antenna, the status indicator does not require manufacturing of additional antenna systems. As such, manufacturing costs are held to a minimum. Further, by being mounted to the exterior of the vehicle, such as, for example, positioned on a vehicle-integrated sharkfin antenna, the status indicator's location is at the highest position of the vehicle allowing maximum visibility around the periphery of the vehicle. The indicator apparatus may be an indicator plate including a first end, a second end opposite the first end, and an indicator positioned between the first and second ends. The indicator may provide an indication of a status of a battery of the electric vehicle by illuminating a portion of the indicator plate based on the status of the battery. As used herein, a vehicle-integrated antenna may refer to a preexisting antenna integrated into the vehicle.

Figure 1:
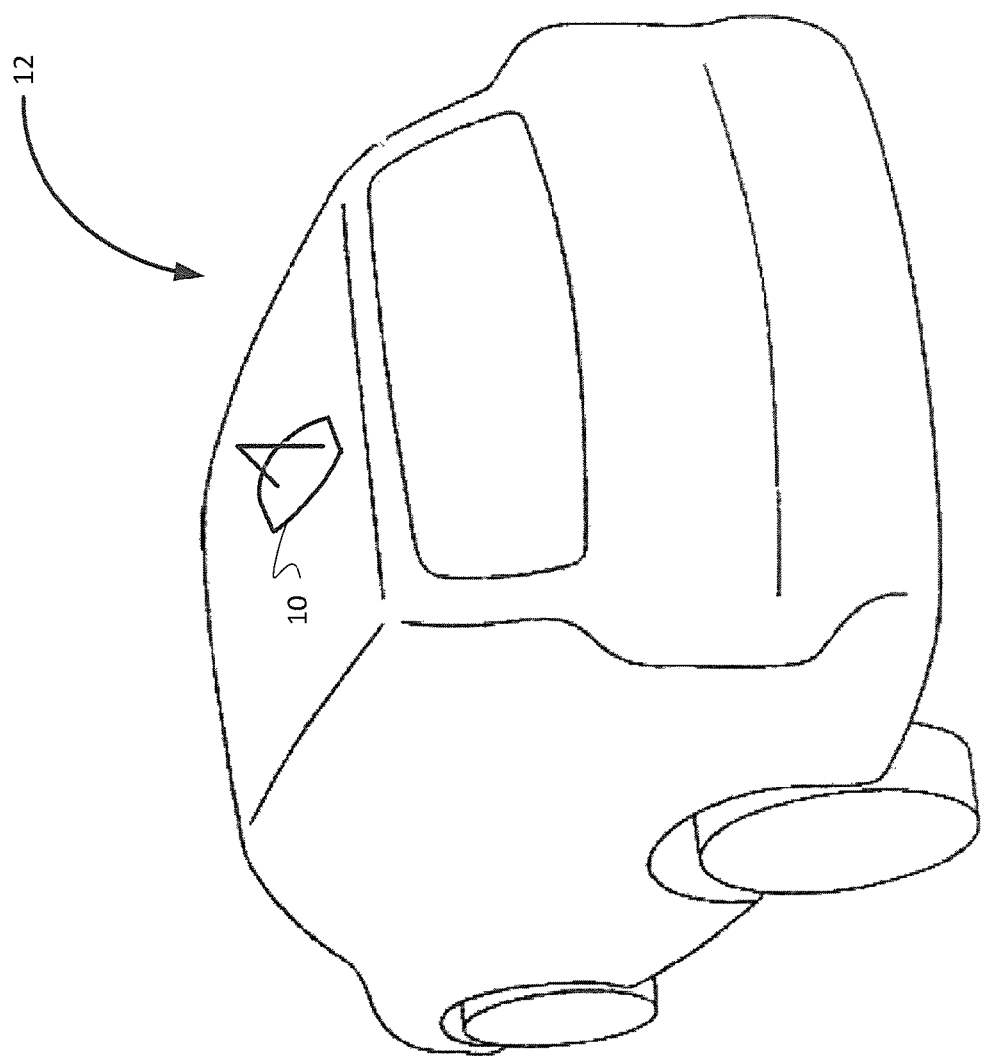
FIG. 1 is a perspective view of an electric vehicle including a status indicator to visibly indicate state of charge information of an electric vehicle.

Thus, as illustrated in FIG. 1, an apparatus may be designed in accordance with the disclosed embodiments to provide a status indicator to visibly indicate state of charge information of an electric vehicle. Referring to FIG. 1, a state of charge indicator 10 is shown attached to an exemplary electric vehicle 12 in accordance with the present disclosure. The state of charge indicator may visibly depict state of charge status information of a battery of the vehicle such that the status information can be seen from various locations around the exterior of the vehicle.

The state of charge indicator may also visibly depict other information such as any error, fault conditions, or balancing conditions of the battery. It should be noted that the electric vehicle 12 may take the form of a plug-in hybrid-electric vehicle, battery electric vehicle, or other hybrid-electric vehicle that may utilize a rechargeable battery that can be recharged with an external power source.

Figure 2:
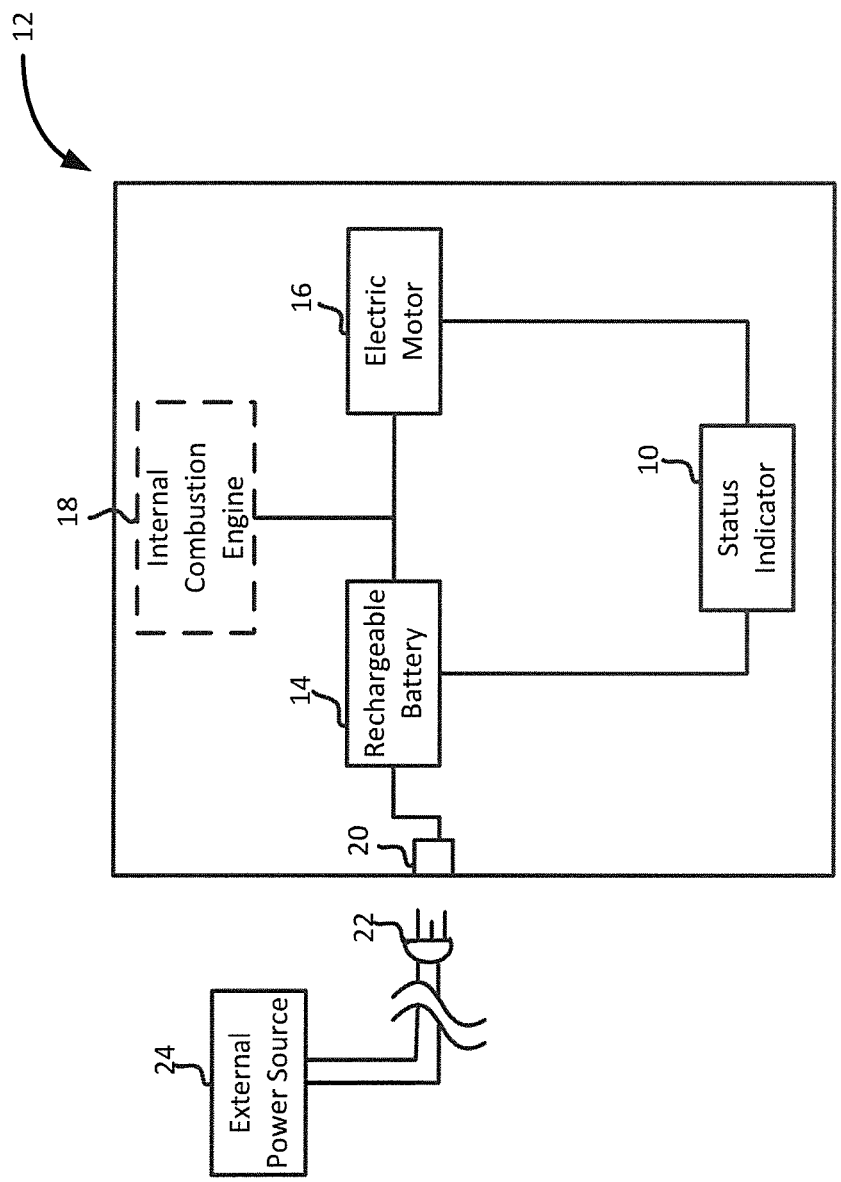
FIG. 2 is a schematic view of the status indicator communicatively coupled to other components of the electric vehicle such as a rechargeable battery, and at least one electric motor.

Referring to the schematic view of the exemplary vehicle in FIG. 2, external status indicator 10 may be communicatively coupled to a rechargeable battery 14, and at least one electric motor 16. In the instance where the electric vehicle is a hybrid-electric vehicle, an internal combustion engine 18 may be included to provide selective power to propel the vehicle 12. The rechargeable battery 14 may be connected to a port 20 accessible from the exterior of the vehicle 12. The port 20 may include a receptacle to receive a plug 22 from a household outlet or other external power source 24 to recharge the battery 14.

In order to provide visible status indications of the electric vehicle, the status indicator is coupled to vehicle diagnostics system (not shown). The vehicle diagnostics system may include a plurality of different vehicle-resident sensors, each sensor providing a measurement related to a state of the sensor or a measurement related to a state of the mounting location of the sensor, a vehicle-resident diagnostic processor coupled to the sensors and arranged to receive and process data from the sensors.

It should be appreciated that the external status indicator 10 may be communicatively coupled to other components of the vehicle 12. Accordingly, the indicator 10 may be able to provide status information related to other vehicle features (e.g., Heating, Ventilation, and Air Conditioning (HVAC) system, braking system, and the like).

Figure 3:
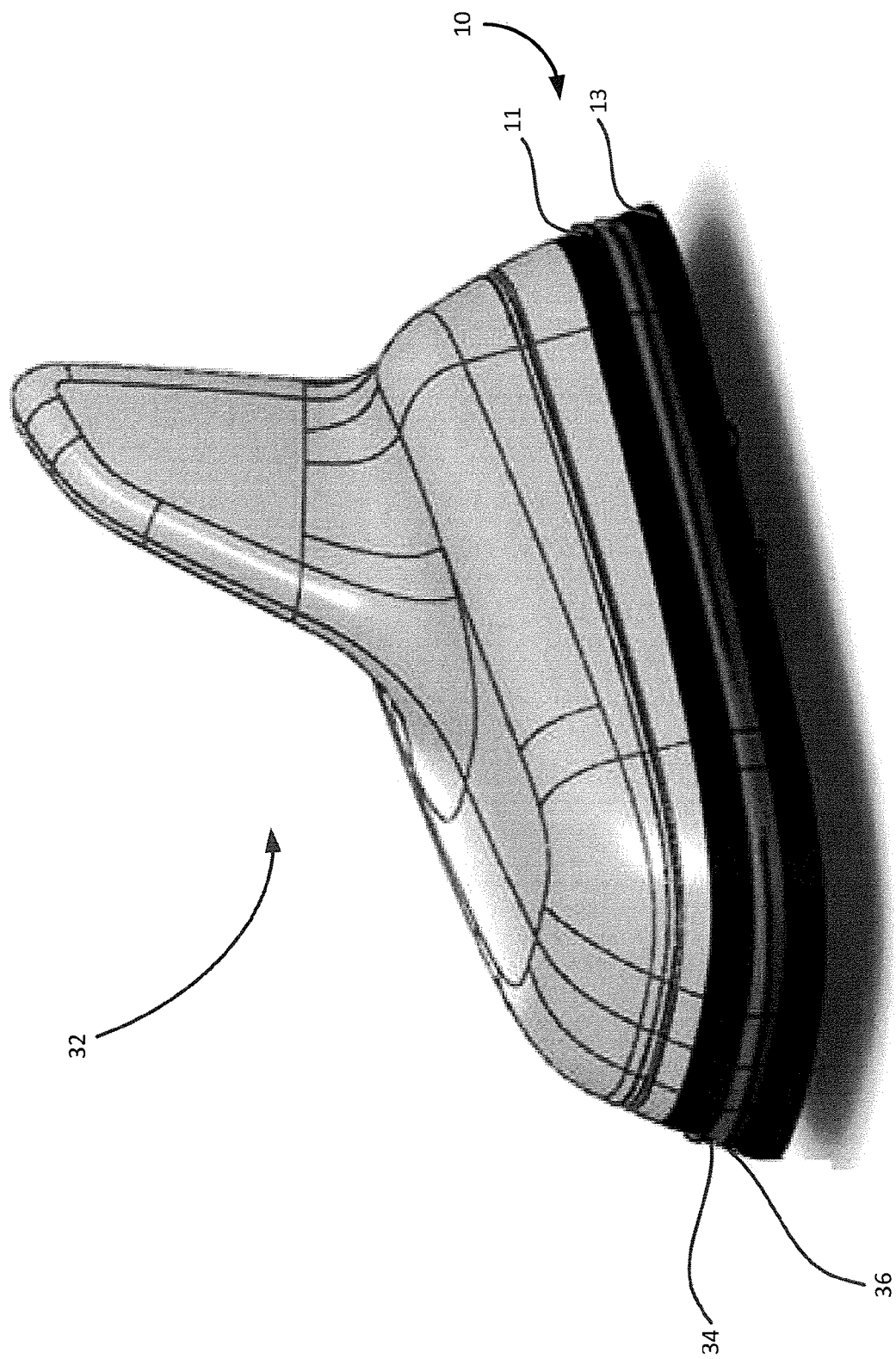
FIG. 3 is a detailed view of the status indicator taking the form of a plate having a first end and a second end opposite the first end, disposed at the base of an antenna.
Figure 4:
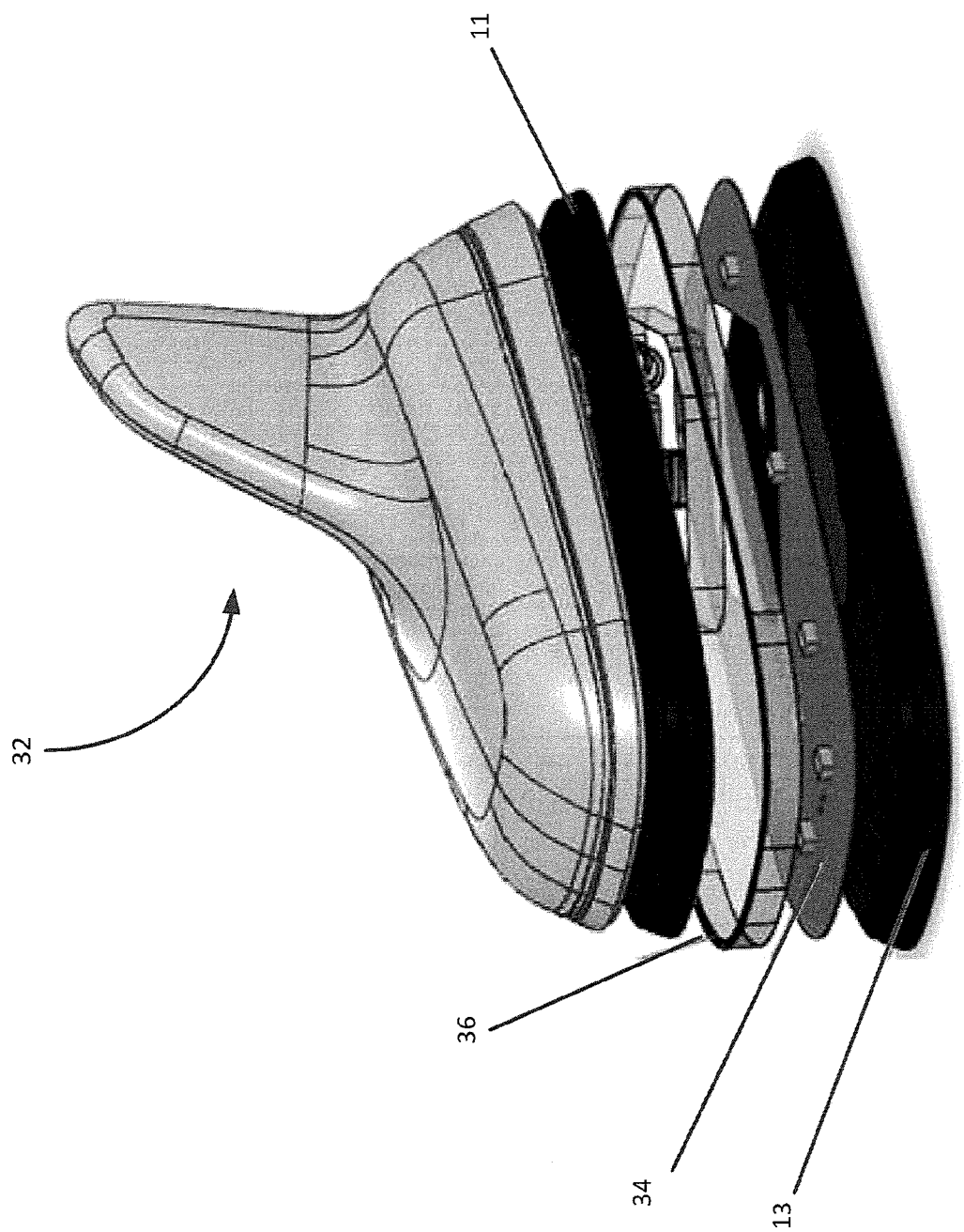
FIG. 4 is an exploded view of the components of the status indicator including the circuit board, casing, first end, and second end disposed at the base of an antenna.

Referring now to FIGS. 3 and 4, a detailed view of the status indicator 10 is shown. The status indicator 10 may take the form of a plate having a first end 11 and a second end 13, opposite the first end 11, disposed at the base of an antenna 32. The first and second ends 11 and 13 may include sealing members, made from any weather resistant material, such as rubber, so as to provide a weather resistant seal to the other components of the status indicator 10, such as the circuit board 34 and light source. These sealing members may be of any weather resistant material, such as rubber. The status indicator may include a circuit board 34 housed within a casing 36. The casing 36 may be farmed of a translucent material, such as plastic, so as to allow light to at least partially pass through. The circuit board 34 may include a light source, such as one or more light emitting diodes (LEDs) disposed thereon. The circuit board 34, and in turn, the light source communicates with the rechargeable battery 14 (as shown in FIG. 2), to provide state of charge information. For example, the circuit board 34 may provide, or be communicatively coupled to the afore-discussed vehicle diagnostics system coupled to the battery 14. Based on vehicle diagnostic data, when the vehicle 12 (as shown in FIGS. 1 and 2) is electrically coupled to the external power source 24 (as shown in FIG. 2), the light source may progressively illuminate as the state of charge of the rechargeable battery 14 increases. For example, the light source may be relatively dim when the state of charge of the battery is between 0 and 25%, somewhat brighter from 25 to 50%, and extremely bright when the state of charge is greater than 50% or full. However, it should be appreciated that any scale of light intensity may be used to represent the state of charge of the battery 14 of the electric vehicle 12.

Alternatively, or additionally, one or more LEDs of the light source may be configured to blink, or flash, based on the state of charge of the rechargeable battery 14. For example, a flashing rate of the LED(s) may increase as the state of charge of the battery increases. As another example, the LED(s) may be set to blink or flash when the battery is only charged from 0% to 50%, or any other predetermined set threshold level; and then may be set to be solid, or continuous, as the state of charge crosses the threshold level.

In yet another embodiment, the light source may be set to illuminate in different colors based on a state of charge of the battery. For example, when the state of charge is from 0% to 25%, the light source may be set to illuminate in a blue tone. When the state of charge reaches a zone of 25% to 50%, the light source may change to a yellow tone. When the battery's charge reaches 75%, the light source may switch to an orange tone until the battery is fully charged, at which time the status indicator 10 may shine green. However, it should be appreciated that embodiments are not so limited. For example, any combination of colors and status levels may be contemplated to depict the state of charge of the vehicle 12.

It should be noted that any of the above discussed techniques for visually depicting a state of charge of the battery of an electric vehicle may also be employed to visually depict other vehicle diagnostic data related to the vehicle, such as any error or fault conditions, whether the vehicle is currently charging, and whether the batteries are currently in a balancing mode, which may be performed by the electric vehicle in an effort to increase the battery's capacity to make all its energy available for use and/or increase the battery's lifetime.

Embodiments of the disclosure also include a method for installing the status indicator to the roof of an electric vehicle. As discussed above, the status indicator may include a first end, a second end opposite the first end, and an indicator plate disposed between and attached to the first and second ends. The method may include removing a vehicle-integrated antenna from the roof of the electric vehicle. The method may include attaching the status indicator to the roof of the electric vehicle. The method may also include mounting the vehicle-integrated rooftop antenna on the second end of the status indicator, the first end now attached to the roof of the electric vehicle. As discussed above, the status indicator may provide an indication of a status of a battery of the electric vehicle by illuminating a portion of the indicator plate based on the status of the battery and may be visible from outside the vehicle.

The disclosed embodiments differ from the prior art in that they provide apparatus and methodologies for providing an additional plate acting as a status indicator of the state of charge of the battery of the vehicle and visible from the outside periphery of the vehicle. Conventional SOC indicators are installed within the dashboard, which, unfortunately, are not viewable to a user who may be positioned outside the vehicle. Disclosed embodiments differ from conventional SOC indicators by being mounted to the exterior of the vehicle, such as, for example, positioned on a vehicle-integrated sharkfin antenna. As such, the status indicator's location is at the highest position of the vehicle allowing maximum visibility around the periphery of the vehicle.

Thus, according to the present disclosure, a system is provided for an apparatus is provided to indicate the status of charge of an electric vehicle, which is visible from outside the vehicle, which can be added to existing vehicle systems and antennae.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An indicator apparatus for indicating a status of an electric vehicle, the indicator apparatus comprising:
   an indicator plate between a roof and a vehicle-integrated rooftop antenna of the electric vehicle, the indicator plate including:
      a first end attached to the roof;
      a second end opposite the first end and attached to the vehicle-integrated rooftop antenna; and
   indication means for providing an indication of a status of a battery of the electric vehicle by illuminating a portion of the indicator plate based on the status of the battery, wherein the indication is visible from outside the electric vehicle, and wherein the indicator apparatus further comprises a power port coupled to the electric vehicle for receiving power from the electric vehicle to the illuminated portion of the indicator plate, and wherein the illuminated portion is illuminated based on vehicle diagnostic data received from the electric vehicle.

2. The indicator apparatus of claim 1, wherein the status is at least one of a state of charge of the electric vehicle, an operational mode, and a fault condition associated with a charging of the battery.

3. The indicator apparatus of claim 1, wherein the indication means provides an indication of the status of the battery by illuminating the portion of the indicator plate in at least one of a first color, and a second color different from the first color.

4. The indicator apparatus of claim 1, wherein the indication means provides an indication of the status of the battery by illuminating the portion of the indicator plate in a flashing manner.

5. The indicator apparatus of claim 1, wherein the first and second ends comprise a weather resistant material.

6. The indicator apparatus of claim 5, wherein the weather resistant material comprises rubber.

7. The indicator apparatus of claim 1, wherein the indication means is housed in a transparent casing positioned between the first and second ends.

8. An indicator apparatus for indicating a status of an electric vehicle, the indicator comprising:
   an indicator plate disposed between a roof and a vehicle-integrated rooftop antenna of the electric vehicle, the indicator plate including:
      a first end attached to the roof;
      a second end opposite the first end and attached to the vehicle-integrated rooftop antenna; and
   an indicator positioned between the first and second ends, the indicator providing an indication of a status of a battery of the electric vehicle by illuminating a portion of the indicator plate based on the status of the battery, wherein the indication is visible from outside the electric vehicle, and wherein the indicator apparatus further comprises a power port coupled to the electric vehicle for receiving power from the electric vehicle to the illuminated portion of the indicator plate, and wherein the illuminated portion is illuminated based on vehicle diagnostic data received from the electric vehicle.

9. The indicator apparatus of claim 8, wherein the status is at least one of a state of charge of the electric vehicle, an operational mode, and a fault condition associated with a charging of the battery.

10. The indicator apparatus of claim 8, wherein the indicator provides an indication of the status of the battery by illuminating the portion of the indicator plate in at least one of a first color, and a second color different from the first color.

11. The indicator apparatus of claim 8, wherein the indicator provides an indication of the status of the battery by illuminating the portion of the indicator plate in a flashing manner.

12. The indicator apparatus of claim 8, wherein the first and second ends comprise a weather resistant material.

13. The indicator apparatus of claim 12, wherein the weather resistant material includes rubber.

14. A vehicle, comprising:
   an electric motor;
   a rechargeable battery coupled to the electric motor;
   an indicator plate disposed between a roof and a vehicle-integrated rooftop antenna of the vehicle, the indicator plate including:
      a first end attached to the root
      a second end opposite the first end and attached to the vehicle-integrated rooftop antenna; and
      an indicator positioned between the first and second ends, the indicator providing an indication of a status of a battery of the electric vehicle by illuminating a portion of the indicator plate based on the status of the battery, wherein the indication is visible outside the vehicle, and wherein the indicator apparatus further comprises a power port coupled to the vehicle for receiving power from the vehicle to the illuminated portion of the indicator plate, and wherein the illuminated portion is illuminated based on vehicle diagnostic data received from the vehicle.

15. The indicator apparatus of claim 14, wherein the status is at least one of a state of charge of the vehicle, an operational mode, and a fault condition associated with a charging of the battery.

16. The indicator apparatus of claim 14, wherein the indicator provides an indication of the status of the battery by illuminating the portion of the indicator plate in at least one of a first color, and a second color different from the first color.

17. The indicator apparatus of claim 14, wherein the indicator provides an indication of the status of the battery by illuminating the portion of the indicator plate in a flashing manner.

18. The indicator apparatus of claim 14, wherein the first and second ends comprise a weather resistant material.

19. The indicator apparatus of claim 14, wherein the weather resistant material includes rubber.

20. A method for installing a status indicator to indicate a status of an electric vehicle, the method comprising:
   removing a vehicle-integrated rooftop antenna from a roof of the electric vehicle;
   attaching the status indicator to the roof of the electric vehicle, the status indicator having a first end, a second end opposite the first end, and an indicator plate disposed between and attached to the first and second ends; and
   mounting the vehicle-integrated rooftop antenna on the second end of the status indicator; wherein the status indicator provides an indication of a status of a battery of the electric vehicle by illuminating a portion of the indicator plate based on the status of the battery, wherein the indication is visible from outside the electric vehicle, and wherein the indicator apparatus further comprises a power port coupled to the electric vehicle for receiving power from the electric vehicle to the illuminated portion of the indicator plate, and wherein the illuminated portion is illuminated based on vehicle diagnostic data received from the electric vehicle.

* * * * *